May 28, 1968 L. W. PARTRIDGE 3,386,003

GROUND PROTECTIVE CIRCUIT

Filed July 18, 1966

INVENTOR

Leslie W. Partridge

By Mason, Kolehmainen, Rathburn & Wyss

ATTORNEYS

United States Patent Office 3,386,003

Patented May 28, 1968

3,386,003

GROUND PROTECTIVE CIRCUIT

Leslie W. Partridge, Janesville, Wis., assignor to The Burdick Corporation, Milton, Wis., a corporation of Delaware Filed July 18, 1966, Ser. No. 565,902
6 Claims. (Cl. 317—17)

The present invention has for its primary object the provision of a circuit in the nature of a grounding circuit for minimizing interference problems and the possibility of shock to users of electrical apparatus such as various instruments, appliances and other load devices energized from an alternating current source, one line of which is grounded.

A further object of the present invention is to provide a circuit of the foregoing type requiring no transformers, shielding of power lines or the like and consisting of a simple circuit comprising a series connected resistor and capacitor connected across the load device and including further a second and high value resistor, or capacitive impedance, connected from the junction of the capacitor and first resistor to the chassis or metallic housing or body of the apparatus.

A further object of the present invention is to provide an interference and shock minimizing circuit including series connected capacitance and resistance means connected in parallel to the load device and/or power source and the junction of which is connected by a high value resistor to the chassis of the device in which the capacitance and resistance means are arranged to provide a voltage at the chassis equal and in phase opposition to the leakage voltage between the load device and chassis whereby these voltages substantially cancel each other to reduce the voltage at the chassis substantially to zero relative to ground. The arrangement enables the aforesaid junction to be connected to the junction by the high value resistor to insure insignificant current flow through anyone touching the chassis even though the load device be connected to a power source with reversed input connections or in the event it is otherwise accidently connected to a high voltage source.

In certain types of electrical equipment having a relatively low leakage to ground such, for example, as electrocardiographs used in doctors offices and the like, it is desirable to leave the instrument chassis ungrounded because of the lack in many cases of a suitable grounding type receptacle and, further, to avoid the necessity of using a three wire cable. However, if the chassis is not grounded, it ofttimes occurs that the chassis is at a relatively high voltage because of leakage capacity between the power cable, etc. and the chassis. In this event, interference problems will develop and shock hazards may be encountered.

In the past, the chassis has sometimes been connected to earth or third wire ground in order to reduce chassis voltage. When a ground has not been available, a resistor was sometimes used to couple the chassis to the power line ground. However, in order to reduce chassis voltage sufficiently, this resistance was relatively low, in the order of 50,000 to 100,000 ohms. This resulted in the possibility of shock in the event the machine was connected to the power lines with reverse polarity with the chassis being connected to the 110 volt line through the resistor.

An advantage of the present invention is that it eliminates the requirement of any ground connection and at the same time the chassis is maintained at approximately zero voltage to ground and, furthermore, it includes a high value resistor between the circuit and chassis providing protection in unusual circumstances such as when the load device is incorrectly plugged in to a power receptacle.

In brief, the arrangement of the present invention includes a first resistor and capacitor connected in series across a load device connected to an alternating current power source having one side grounded, the capacitor being connected to the grounded side of the device and/or ground wire. The arrangement further includes a high value resistor (or capacitive impedance) connecting the junction of the first resistor and capacitor to the chassis. The first resistor and capacitor are so chosen as to provide at the chassis a voltage equal in magnitude and of opposite phase to the device-to-chassis leakage voltage. As a result the chassis is substantially at zero voltage relative to ground and the second resistor provides protection to anyone touching the chassis load device when the load device is connected to the power source with the wrong polarity.

Other objects and advantages of the present invention will become apparent from the ensuing description of illustrative embodiments thereof, in the course of which reference is had to the accompanying drawing, in which.

Figure 5:
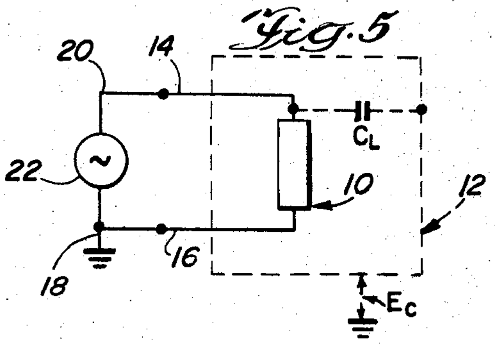
FIGS. 5, 6 and 7 are explanatory circuit diagrams of a prior type of grounding circuit.

Referring first to FIG. 5, the reference character 10 indicates an electric or electronic apparatus which may be an electrocardiograph or other electronic instrument, appliance or the like and including a chassis. The term chassis is utilized broadly to mean the enclosure of any conducting material that can be touched and housing containing or supporting the device 10, the chassis being indicated by reference character 12. The device 10 is supplied with power through the lines 14 and 16, the latter of which is connected to the ground wire 18 and the former of which is connected to the so-called hot line 20 of an alternating current power source character 22, generally 110 volt power lines.

The load device 10 has a capacitive coupling between its parts and wires to the chassis 12. This capacity, which is generally termed leakage capacity, is represented by the capacitor $C_L$ and line voltage will cause current to flow through it so that the chassis will be at a voltage $E_c$ above ground.

Figure 6:
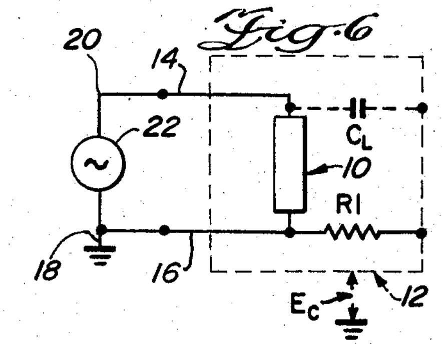

FIG. 6 illustrates a common expedient utilized in the past for decreasing the chassis voltage $E_c$. Ordinarily, this is done by means of an impedance between the ground wire 16 of the supply to the load device, this impedance being, for example, a resistor R1. The lower the impedance, the closer $E_c$ approaches ground potential or zero. In many electronic devices the grounding impedance R1 can be about 100,000 ohms which will result in a voltage $E_c$ of a few volts. If R1 were as low as 10,000 ohms, $E_c$ would be a few tenths of a volt.

Figure 7:
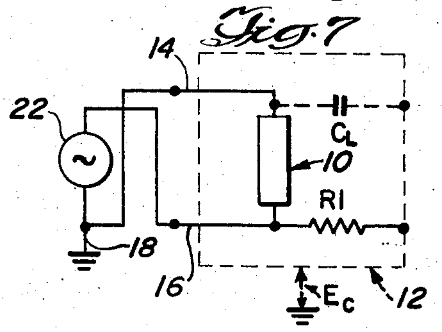

FIG. 7 indicates a problem arising in the event the load device is connected to the power source with the wrong polarity. With a wrong polarity connection, the chassis voltage is almost equal to line voltage because of the connection of the chassis to the hot line through R1. If a grounded person were to touch the chassis he would receive an electrical shock, the magnitude of which would be a function of the value of the grounding resistor R1. If R1 were 100,000 ohms, a maximum current of 1.2 milliamperes would flow with a line voltage of 120 volts. This would be mildly stimulating. If R1 were 10,000 ohms, 12 milliamperes could flow and this would provide a bad shock.

Figure 1:
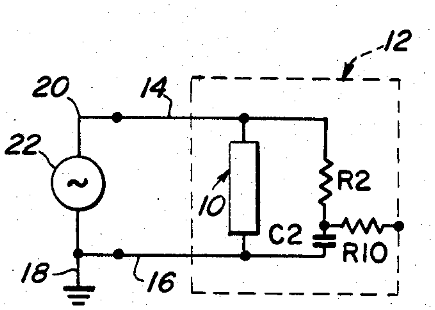
FIG. 1 is a diagram of a circuit embodying the present invention.

Referring now to FIG. 1, it illustrates the improved circuit of the present invention. It will be noted that the improved circuit includes a resistor R2 and a capacitor C2 connected in series with each other and in parallel with the load device 10, and, thus, across the power lines 14 and 16 and that the junction of the resistor and capacitor is connected by resistor R10 to the chassis, the chassis being ungrounded. The network R2–C2 provides a voltage for R10 compensating or cancelling the leakage produced voltage from chassis to ground even though R10 may be made to have a high resistance such as 500,000 ohms to 10,000,000 ohms.

Figure 2:
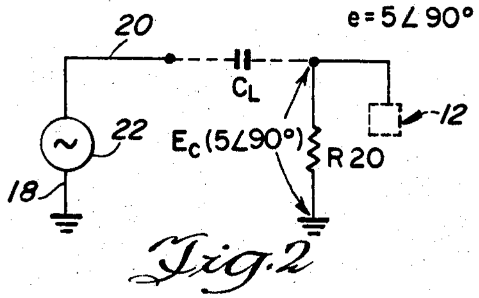
FIGS. 2, 3 and 4 are explanatory circuit diagrams utilized in explaining principles of the circuit of FIG. 1.

The operation of the circuit of FIG. 1 will be further described in connection with FIGS. 2, 3 and 4. Referring first to FIG. 2, it will be noted that the leakage capacitance $C_L$ is again shown between the hot line 20 and the chassis 12. The resistor R20 is used for illustrative purposes and shown connected between the chassis and ground. The leakage current through $C_L$ may cause a voltage drop across R20 such as to produce, for example, a voltage $E_c$ of five volts at a phase angle of about plus 90 degrees (5/90°).

Figure 3:
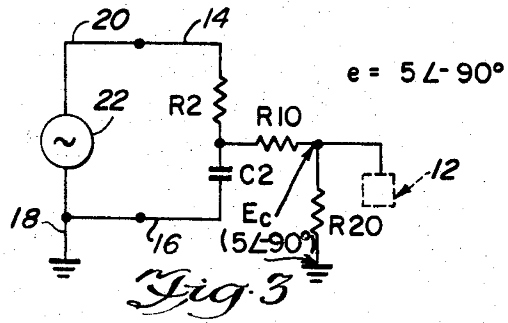

Referring next to FIG. 3, the power lines 14 and 16 are shown connected across the series connected resistor R2 and capacitor C2 and the junction of the latter is connected by resistor R10 to the chassis. The resistance R2 and capacitor C2 are so proportioned that there is developed a voltage across the capacitor C2 which, when connected to the resistor R20 through the resistor R10, produces a voltage drop of five volts across R20 at a phase angle of about minus 90 degrees (5/−90°).

Figure 4:
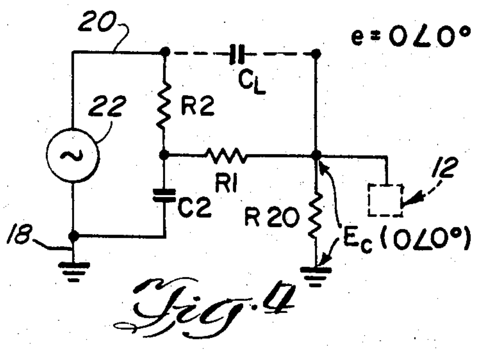

FIG. 4 combines FIGS. 2 and 3. It will be seen that FIG. 4 is substantially the new circuit of FIG. 1 except that it includes the illustrated resistor R20 which can be eliminated from the circuit, and has been eliminated from FIG. 1, since it is only included in the description of the operation.

It will, therefore, be noted that the chassis 12 is ungrounded but that equal voltages of opposite phase are applied to the chassis through the leakage capacity $C_L$ and the network R2–C2 and resistor R10 and that the voltage drop across resistor R10 is approximately zero (0/0°).

The capacitor C2 has a low impedance relative to the resistor R2 and in order, under certain conditions, better to protect against electrical shock the resistor R10 is generally made to have a high resistance such as 500,000 ohms or higher.

One of the reasons for making the resistor R10 with high resistance is to provide against shock in the event the load device is connected to the power source with reverse polarity, i.e., with the relatively lower impedance capacitor C2 being connected to the hot line. In this case the resistor R10 will provide the requisite protection against undesired electrical shock. The resistor R10 may, in certain instances, be replaced by a high impedance capacitor, although, generally speaking, a resistor is preferable because of the longer life expectancy of a resistor.

Figure 8:
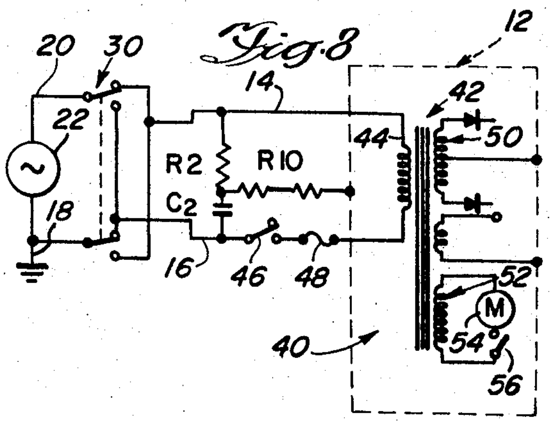
FIG. 8 is a circuit diagram of an embodiment of the invention including a line polarity switch.

If desired, the load device may be connected to the power supply through a reversing switch 30, as illustrated in FIG. 8, so that the proper polarity connection can be made. In addition, FIG. 8 illustrates an application of the invention to an electrocardiograph 40 energized through power lines 14 and 16 and having a chassis 12 to which the circuit components R2, C2 and R10 are connected in the manner heretofore described. In the present instance the electrocardiograph components are energized through a transformer 42 having a primary winding 44 effectively constituting part of a load device to which the power supply conductors 14 and 16 are connected. The circuit to the primary winding may be completed through a main power switch 46 and a safety fuse 48. The electrocardiograph has not been illustrated in full but it may include components energized through the secondary windings 50, 51 and 52 and have a relatively low leakage to ground. Winding 50 may be utilized in known manner to energize high voltage components; winding 51 may supply low voltage components; and winding 52 may supply a motor 54 utilized for the electrocardiograph paper drive and under the control of a manually operable switch 56. In the installation described, the resistor R2 had a value of 3,000,000 ohms, the capacitor C2 had a value of .047 mf. (about 60,000 ohms at 60 cycles) and the resistor R10 a value of 540,000 ohms.

Advantages of the present invention include maintenance of the chassis at substantially ground potential to minimize interference and possible shock to users without any requirement of a connection of the chassis to ground; the circuit arrangement is simple and requires actually but three components, these being the resistors R2 and R10 and the capacitor C2; the circuitry requires no transformers; and, furthermore, there is no requirement that the power lines, etc. be shielded.

While the present invention has been described in connection with the details of an illustrative embodiment, these details are not intended to be limitative of the invention except insofar as set forth in the accompanying claims.

What is claimed as new and desired to be secured by Letters Patent of the United States is:

1. A circuit for minimizing the possibility of shock to users of apparatus comprising an electrical load device and a chassis and energized from an alternating current source having one terminal grounded, the chassis being ungrounded, a series connected first resistor and capacitor connected across the load device with the capacitor connected to the grounded side of the load device, and a second resistor of high resistance or a high impedance capacitance connected from the junction of the capacitor and first resistor to the chassis, said first resistor and capacitor having values such that the voltage drop across the capacitor is substantially equal in amplitude and of opposite phase to the voltage due to leakage capacity between the load device and the chassis, whereby the said voltage drop and voltage due to leakage will substantially cancel each other and the junction will be at approximately zero voltage relative to ground.

2. A circuit as claimed in claim 1 wherein the value of said second resistor is on the order of 100,000 to 10,000,000 ohms.

3. A circuit as claimed in claim 1 wherein the value of said second resistor is about 500,000 ohms.

4. A circuit as claimed in claim 1 wherein the value of said second resistor is above 500,000 ohms.

5. A circuit as claimed in claim 1 wherein said first resistor has a high impedance relative to that of said capacitor.

6. A circuit as claimed in claim 1 including a polarity reversing switch between the alternating current source and the load device.

References Cited

UNITED STATES PATENTS

| | | | |
|---|---|---|---|
| 3,072,827 | 1/1963 | Benish | 317—18 |
| 3,253,188 | 5/1966 | Nissel | 317—18 X |

MILTON O. HIRSHFIELD, *Primary Examiner.*

J. D. TRAMMELL, *Assistant Examiner.*